Jan. 4, 1944.   O. E. HERMANNS   2,338,329
MOLDING APPARATUS
Filed Dec. 31, 1940   3 Sheets-Sheet 2
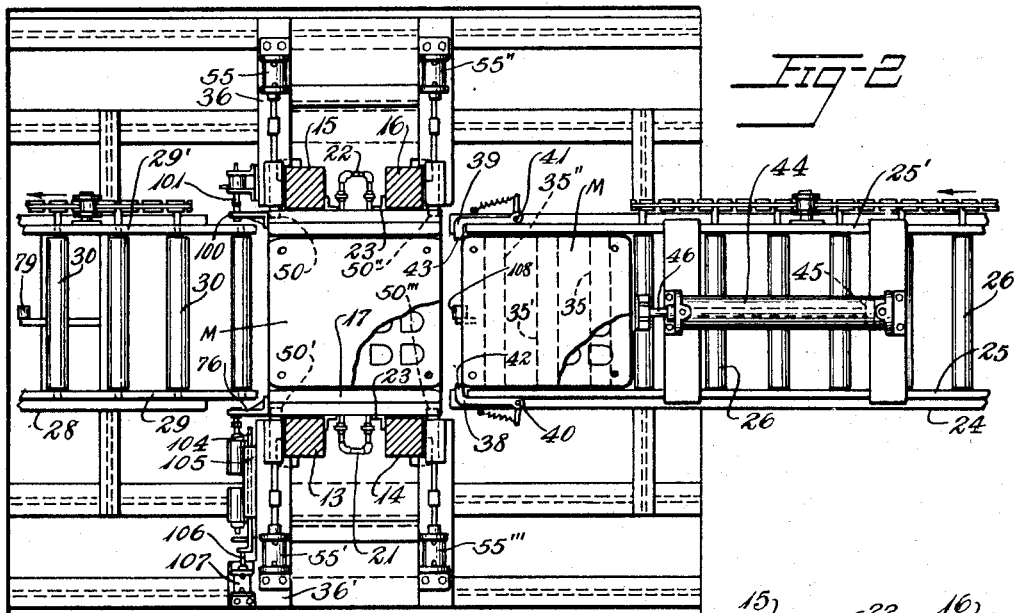
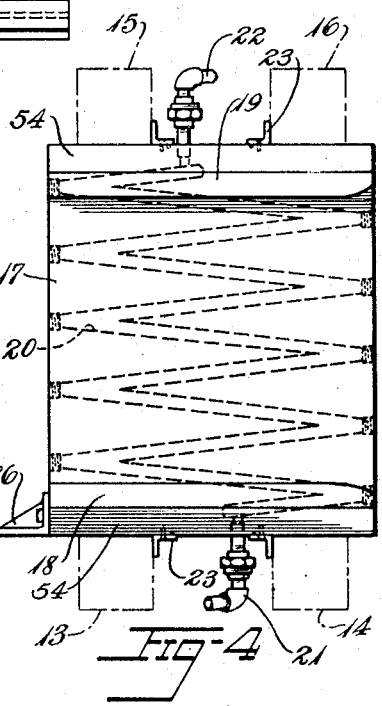
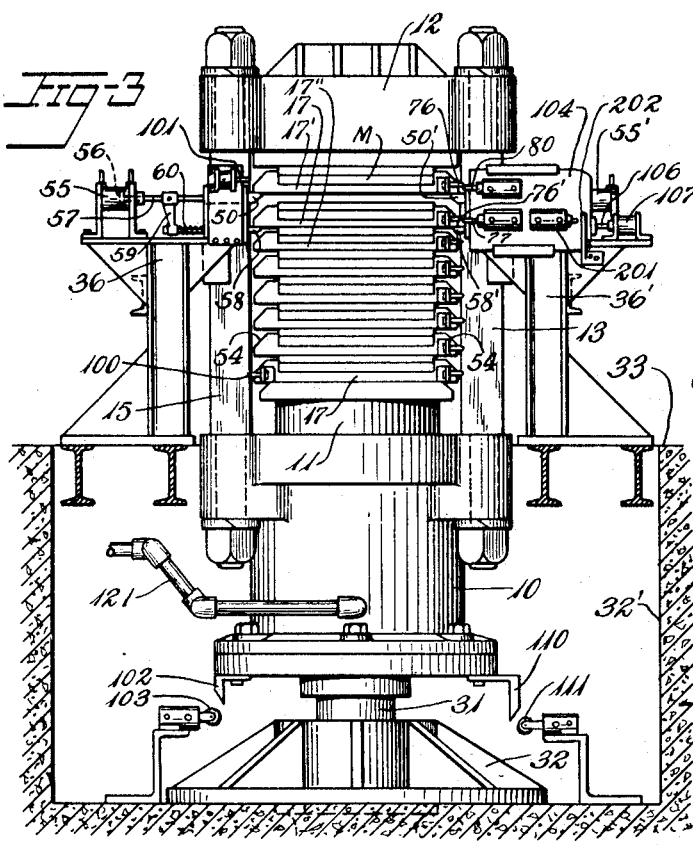
Inventor
Otto E. Hermanns

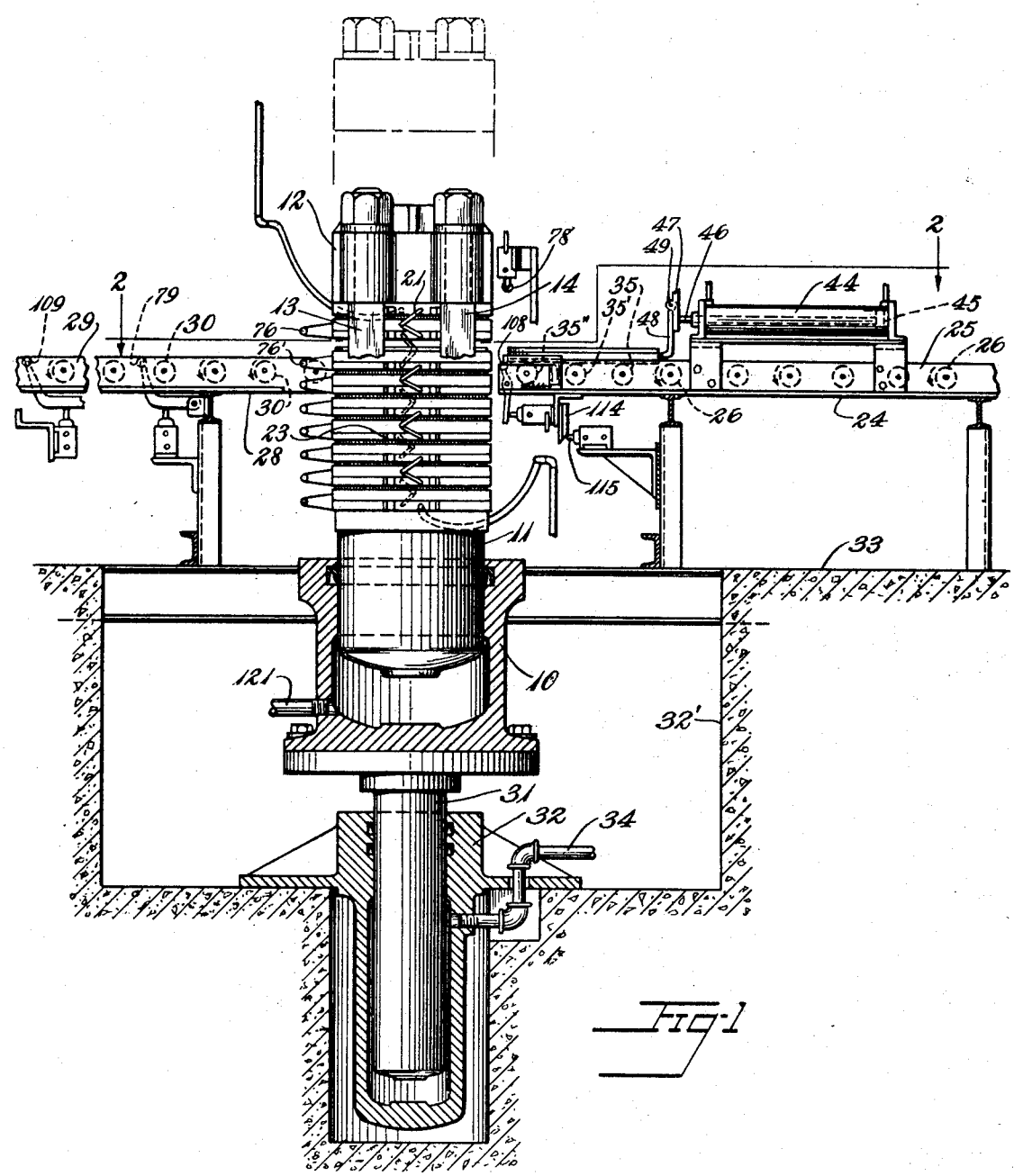

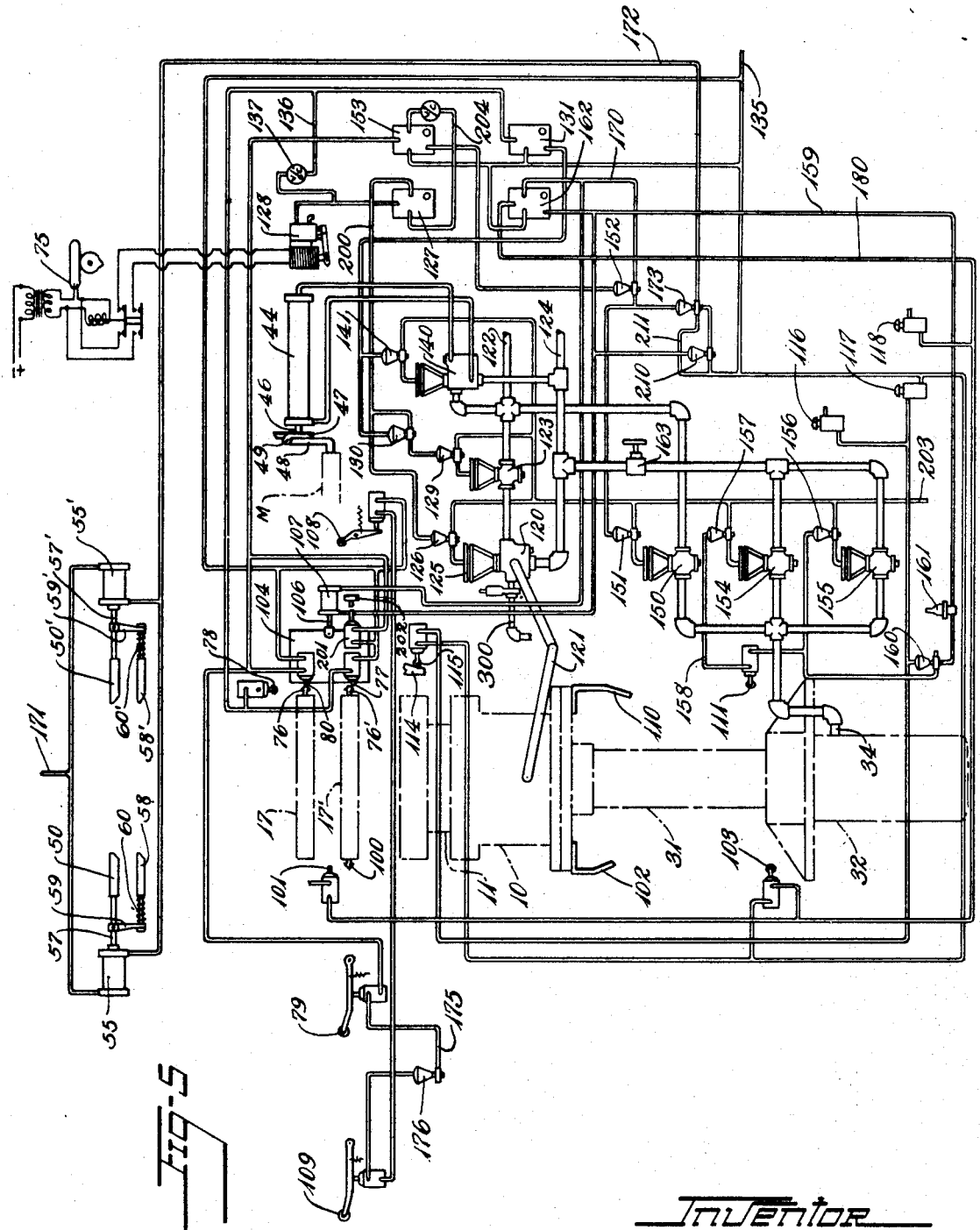

Patented Jan. 4, 1944

2,338,329

UNITED STATES PATENT OFFICE 2,338,329

MOLDING APPARATUS

Otto E. Hermanns, Akron, Ohio, assignor to The B. F. Goodrich Company, New York, N. Y., a corporation of New York Application December 31, 1940, Serial No. 372,441

11 Claims. (Cl. 18—16)

This invention relates to the molding of articles from rubber or other plastic materials and is especially useful where articles are to be molded by a progressive handling of the molds.

In apparatus used heretofore for molding articles of plastic material by the application of pressure to a plurality of molds at one time, difficulties and objections have existed detracting from the satisfactory character of such apparatus. The objectionable characteristics have included the necessity in some cases of not only transporting the molds to the press but also lifting or lowering them to other levels for introduction into the press with an attendant inconvenience in handling or the necessity of cumbersome conveying apparatus, or both. Where the molds have been manipulated by hand the likelihood of injury to the operators has been present owing to the weight of the molds and the difficulty of handling them and controlling the operation of the press. A further difficulty has resulted from the fact that prior apparatus has been of such a nature as to require considerable time and also waste of hydraulic medium for movement of the press ram to accommodate a changing number of molds. In some cases there has been an objectionable release of all pressure on all the molds.

The present invention aims to overcome the foregoing and other difficulties and to provide safe and efficient apparatus of new and improved construction and operation.

The principal objects of the invention are to provide for handling molds in succession into and out of the press and preferably at a constant level, to provide this with minimum release of pressure and minimum platen separation, especially in the early stages of cure, to provide for molding the article by applications of molding pressure progressively, to provide for release of entrapped gases at regular intervals throughout the period of vulcanization of the articles, to provide for alignment of the press, preferably automatic, at a loading and unloading level, to provide for bodily elevating and lowering the press to the transfer level, to provide against injury to operators and equipment, and generally to provide efficiency of operation and facility of handling.

These and other objects will appear from the following description and the accompanying drawings.

Of the drawings:

Fig. 1 is a side elevation of the apparatus partly in section and partly broken away, showing the press in a lowered position, the elevated position of the press being shown in dot and dash lines.

Fig. 2 is a sectional plan thereof, taken on line 2—2 of Fig. 1, parts being broken away.

Fig. 3 is an end elevation of the press and its supporting mechanism, parts being broken away and parts shown in section.

Fig. 4 is a detail plan view of one of the platens.

Fig. 5 is a piping diagram of the apparatus.

In accordance with the invention there is provided a molding press with means for elevating and lowering it step by step to align its mold openings successively at a loading station with mold conveying means and with means for loading and unloading it. Referring to the drawings which show an embodiment of the invention in which the press is operated by hydraulic pressure, the numeral 10 designates the cylinder, 11 the ram, and 12 the head of a hydraulic press. The head 12 is fixed with respect to the cylinder by squared posts 13, 14, 15, 16 which act as guides and hold the cylinder and the head in spaced-apart relation. A plurality of movable platens 17, 17', 17" are provided between the ram, and the head and each comprises a plate having raised parallel guide ribs 18, 19 on its upper face defining a groove therebetween for slideably engaging a mold M. Each platen as indicated in Fig. 4, is cored or otherwise chambered, as at 20 for circulation of steam or other heating medium, and swing steam connections 21, 22 are provided so that the platens may be heated in series while permitting their separation from each other. Guide pieces 23 are also mounted on the platens to engage the squared rods.

Located at the loading side of the press is a conveyor 24 comprising rails 25, 25' between which are rotatably mounted a series of driven conveyor rolls such as 26 for feeding molds M to the press. A similar conveyor 28 having rails 29, 29', at the opposite side of the press supports driven conveyor rolls such as 30 for propelling molds away from the press. The conveyors 24, 28 are at the same level so that molds may be transferred from one to another through the press.

To provide for aligning any of the mold openings with the conveyors, the entire press is mounted on the ram 31 of a hydraulic cylinder 32. Conveniently, a pit 32' is provided below the floor 33 to receive the press, and the cylinder 32 is mounted at the bottom of the pit. When fluid under pressure is supplied to cylinder 32 through a pipe 34 from a suitable source of hydraulic pressure by control mechanism hereinafter described, the press is raised with respect to the conveyors, and when the fluid pressure is released by the same control mechanism the press is lowered.

In order to prevent advance of a mold into the press when not desired, several idler rolls 35, 35', 35'', are provided at the end of the conveyor 24 and spaced apart over sufficient area as to underlie a mold at the end of the conveyor. A pair of spring pressed stops 38, 39 are also pivoted to the rails as at 40, 41 and have inwardly turned inclined ends 42, 43, normally in the path of the mold, to resist further movement of the molds. The arrangement is such that when a procession of molds is advanced over the conveyor toward the press by the live rolls 26 the first mold of the procession advances to the stops 38, 39 which offer greater resistance to forward travel than the frictional resistance of the molds to the live rolls 26 so that advance of the procession is delayer until the first mold is released by a superior pressure applied against the stops.

To provide such superior pressure for advancing the molds one at a time past stops 38, 39, a double-acting fluid pressure operated cylinder 44 is fixed above conveyor 24. Its piston 45 is fixed to a piston-rod 46 adapted to operate in a direction lengthwise of the rails 25. A ram 47 is fixed to the outer end of the piston rod, and a dependent dog 48 is hinged thereto, as at 49. The arrangement is such that when the piston is advanced toward the press, the dog 48 engages behind the leading mold and pushes it past the stops 38, 39, and on the return stroke the dog 48 swings on its pivot to clear the next mold and engages it from behind.

To provide for retaining the molds in closed relation when the press is opened to receive or discharge one of the molds, horizontally movable wedges 50, 50', 50'', 50''' are provided at the four corners of the press and each of these wedges is slideably mounted on stationary supports 36 for horizontal movement in position to engage under the uppermost movable platen of the press when the press is in its lowest position or under the other platens in succession when the press is successively adjusted to align other platens therewith as hereinafter described. To permit such engagement each platen 17 has its upper margin chamfered as at 54 to provide clearance for the wedges which are chamfered accordingly on their lower faces. This provides clearance space for the wedges to enter.

For supporting the platen underlying a mold to be shifted while the wedges are supporting the platen thereabove in addition to the support afforded by the ram 11, and to support said platen should hydraulic pressure on the ram 11 fail, wedges 58, 58', 58'', 58''' are provided below wedges 50. These lower wedges are mounted to slide horizontally on stationary guides of support 36, 36'. A bracket 59 is fixed to each piston rod 57 and has an eye through which the shank of the wedge 58 is slideably mounted. A coil spring 60 encircles the shank of the wedge and impinges against the bracket 59 at one end and against an abutment on the shank at the other. The arrangement is such that as each wedge 50 is advanced its corresponding wedge 58 is advanced with it under spring pressure and should the wedge 58 strike the edge of a platen it will stop its advance until the platen is raised above it. The wedge 58 serves as a safety device in case the pressure on the ram 11 fails or the ram descends too far to support the platen under the molds being transferred at the transfer level.

Opening and closing of the press at regular intervals is controlled by suitable means such as an electrical timing mechanism of well known construction indicated at 75 in Fig. 5. This mechanism closes an electrical circuit at regular intervals thereby releasing the pressure on ram 11 causing it to descend until a finger 76 on the edge of the uppermost platen engages a contactor 77 located in its path. This contactor through suitable control mechanism arrests downward movement of the ram by control of the hydraulic water supply and exhaust. The entire lowering movement of the ram is just sufficient to provide clearance to remove the top mold.

Simultaneous with the stopping of the ram 11 in its lowering movement, ram 47 is forced forward, initiated by contactor 77, and propelling the first mold into the space above the uppermost movable platen. Any mold occupying that space is moved out by the incoming mold onto conveyor 28.

As the ram 47 reaches a position near the press where the mold has been sufficiently advanced, it engages a contactor 78, fixed in position with respect to the conveyor, which through suitable control mechanism elevates the ram 11 closing the press and simultaneously reverses the supply and exhaust to cylinder 44, returning the ram 47 to its original positon. The outgoing mold, when it has cleared the press, depresses a contactor 79, mounted on conveyor 28, which through suitable control mechanism admits hydraulic pressure to cylinder 32, and closes the drain thereto, thereby raising the press to a new level.

When the new level is reached a similar finger 76' on the second platen depresses a contactor 80 which through suitable control mechanism closes the supply line 34 and stops the second platen above the elevation of the conveyors so that on subsequent lowering of the ram 11 the second platen 17' will be lowered to the level of the conveyors. Each of the platens is provided with such a projecting finger 76, 76'.

When the press is stopped in its elevating movement by contact of its finger 76, 76' with contactor 80, the wedges 50 are simultaneously advanced toward the platens through suitable control mechanism so as to hold the platens thereabove and the molds thereon in closed relation and to prevent lowering of the molds above the molds to be transferred below the conveyor level.

Opening and closing of the press is performed as each platen reaches the transfer level and between opening movements, the press is elevated step by step until the lowest mold on the press has been closed. The press will then be at its highest position in which at the last closing movement, an arm 100 fixed to the lowest platen depresses a contactor 101 fixed to the support 36 and through suitable mechanism withdraws the wedges while the ram 31 lowers the press to its lowest position at which an arm 102 on the press cylinder 10 depresses a contactor 103 fixed in the pit 32 and through suitable mechanism pushes the wedges in again.

To provide for causing contactors 77 and 80 to be inoperative during the lowering of the press and thereby preventing their repeated operation by contact with fingers 76 on each platen as the platens pass them, these contactors are mounted on a panel 104 mounted to slide horizontally on stationary ways 105, fixed to support 36', and fixed to the piston rod 106 of a stationary double acting fluid pressure cylinder 107 fixed to said support. The arrangement is such that by means of the cylinder the contactors may be moved into or out of platen contacting position. When the press is elevated to its highest position and contactor 101 fixed to support 36 is depressed by an arm 100 fixed to the bottom platen, the cylinder 107 is energized through suitable mechanism to withdraw the panel and when the press is lowered to its lowest position so that arm 102 engages contactor 103 the cylinder is energized through suitable mechanism to return the panel to operative position.

Apparatus is provided to prevent the raising or lowering of the press unless a mold from conveyor 24 has fully entered the press. For this purpose a contactor 108 extends above the conveyor 24 at its end nearest the press. This contactor is connected to the press elevating mechanism so that when a mold is lying thereover the elevating mechanism is inoperative. A similar contactor 109 normally projects above conveyor 28 and is so connected with the press elevating mechanism that presence of a mold thereover will prevent operation of the elevating mechanism. It is located beyond contactor 79 at such a position as to contact with a mold on the conveyor thereover when a mold leaving the press in procession is over contactor 79. It is useful in case the outgoing conveyor 28 becomes so crowded as to prevent the ram 47 from pushing a mold completely from the press.

Where the elevator 31 is controlled hydraulically it is desirable to decelerate the elevator as it nears its lowest position so as not to stop the weight of the press suddenly. For this purpose a cam arm 110 is mounted on the press in position to depress a contactor 111 in advance of contact of arm 102 with contactor 103. Through suitable control mechanism contactor 111 partially shuts off the drain line to cylinder 32 in advance of complete closing of the line by contactor 103.

To provide against damage to the conveyor 24 and to a mold passing therefrom to the press a finger 114 is mounted on the conveyor 24 in position to depress a contactor 115 upon any substantial deflection of the conveyor. It acts through suitable control mechanism to prevent elevation or lowering of the press.

To provide for manual operation of the press in the event of accident or for repair purposes, manually operated contactors 116, 117, and 118 are provided. These are located at convenient positions near the press. Contactor 118 performs the same operations as contactor 101 and causes the elevator to descend. Contactor 116 is employed for stopping descent of the elevator and contactor 117 causes the elevator to continue its descent after being stopped by contactor 116.

The control mechanism whereby the various mechanisms are operated from the contactors may be electrical, pneumatic, or mechanical. Due to the fact that compressed air is ordinarily available in press rooms, this provides a convenient control medium and suitable control mechanism principally operated by compressed air is illustrated in Fig. 5. For positive operation of some of the valves and the contactors it is desirable to employ relatively high pressure air such as air at 65 pounds per square inch whereas some of the valves available on the market are built for lower operating pressures, such as 25 pounds per square inch. It is advisable therefore to operate some of the valves through relay valves. This arrangement also makes possible the interlocking of the control mechanism so as to prevent undesirable movements of a machine element out of its regular turn.

Referring to Fig. 5, valve 120 is a two pressure four-way "Sinclair" hydraulic valve which is connected to cylinder 10 of the press by a swing jointed pipe 121 for supplying hydraulic pressure to or draining the cylinder. When pressure is applied to the diaphragm of this valve it opens the supply line and closes the drain, and when pressure is not applied to the diaphragm the drain opens and the supply line closes. It is connected to a high pressure hydraulic supply line 300 directly and to a low pressure hydraulic supply line 122 through a second control valve 123. It is also connected directly to a drain line 124, and is of such construction that when the press is closed by the low pressure, the high pressure is automatically applied and when the press opens, the high pressure line is automatically closed so that control of this low pressure line only is necessary to control of both high and low pressure. This valve 120 has its diaphragm 125 normally under air pressure supplied from a low pressure line 203 through a diaphragm controlled three-way air valve 126, adapted to connect it to the supply line 203 or to the atmosphere, which in turn is controlled by a "Ross" pilot controlled four-way master valve 127, having one outlet plugged, the pilot cylinder of which is controlled by exhaust through a "Ross" solenoid operated valve 128, to the atmosphere, or by supply of air under pressure as hereinafter described. The solenoid of valve 128 is energized at regular intervals by the timer 75. Control valve 123 is normally closed and its diaphragm is controlled by pressure applied to its diaphragm and controlled by a three-way air valve 129, the diaphragm of which is controlled by a second diaphragm controlled three-way air valve 130, the diaphragm of which is controlled by a "Ross" pilot controlled four-way master valve 131, the pilot cylinder of which is exhausted by previous operation of a contactor valve 78 when the press is closed.

When the press is to be opened, the timer 75 operates solenoid valve 128, which permits exhaust of air from the pilot cylinder of valve 127. The pilot cylinder of valve 131 is in exhaust position at this time. Valve 127 exhausts the diaphragm of valve 126 which in turn exhausts the diaphragm of valve 125 which opens the drain and closes the supply lines to cylinder 10 causing the ram 11 to be lowered.

Contactor 77 is a normally closed pilot valve which is adapted to supply compressed air at high pressure from a line 135 to the pilot cylinders of master valves 127 and 131, these pilot cylinders being connected to each other by a line 136 having a check valve 137 therein which permits flow only from valve 131 toward valve 127.

When the press has opened to a point where arm 76 depresses contactor 77, air under pressure is supplied to the pilot cylinders of valves 127 and 131. Valve 127 then applies pressure to the diaphragms of valves 126 and 129 through line 200, and valve 126 puts pressure on the diaphragm of valve 120 thereby closing the drain thereto and opening its supply line. However, at the same time valve 131 exhausts the diaphragm of valve 130 which in turn exhausts the diaphragm of valve 129 which in turn exhausts the diaphragm of valve 123 which closes the hydraulic supply line to cylinder 10 stopping the ram 11 in its lowering movement. As valve 120 controls both the drain line and the supply line to the press cylinder 10, and opens one as it closes the other, the use of an additional valve 123 in the supply line makes possible the closing of the supply line and the drain line thereto at one time to hold the press platen at a certain position.

The control mechanism for closing the press, previously mentioned, is as follows: Contactor valve 78 is normally closed but when contacted by ram 47 it opens line 136 to exhaust. This exhausts the pilot cylinder of master valve 131, but due to check valve 137, the pilot cylinder of master valve 127 is not exhausted. Master valve 131 in this position applies pressure to the diaphragms of pilot valves 130 and 141. Valve 126 which controls valve 120 is directly on a line 200 and closes the drain, and at the same time valve 130 opens under pressure a branch of this pressure line 200 extending from master valve 127 to pilot valve 129 putting pressure on the diaphragm of valve 129 which opens applying pressure to the diaphragm of valve 123 which supplies hydraulic pressure to cylinder 10, closing the press. At the same time valve 141 reverses valve 140 to return the ram 47 as described in the following paragraph.

As previously described, closing of the press is initiated by contact of the ram 47, which loads the press, with contactor 78. Cylinder 44 which operates ram 47 has its opposite ends connected to a reversing valve 140 for hydraulic operation. Valve 140 is a "Sinclair" four-way diaphragm operated hydraulic valve which is connected to hydraulic supply line 122 and to drain line 124. Its diaphragm is controlled by a three-way air valve 141 the diaphragm of which is operated by master valve 131, previously described. With the press closed, the pilot cylinder of valve 131 is exhausted, the diaphragm valve 141 is under pressure, and the piston of cylinder 44 is at the right end as seen in Figs. 1, 2, and 5. Where the press has been opened so that valve 77 is opened by contact with the platen to be loaded, pressure is applied to the pilot cylinder of valve 131 from a supply line 135 which then exhausts pressure from valve 141, which reverses valve 140 applying hydraulic pressure to the rear or right end of cylinder 44 and connecting its forward end to the drain line, thereby advancing a mold on conveyor 24 into the press. As the ram 47 reaches the end of its stroke it depresses contactor 78 which exhausts the pilot cylinder of valve 131 thereby exhausting valve 141 which reverses valve 140 returning the ram 47. The check valve 137 prevents contactor 78 from exhausting the pilot cylinder of valve 127 during this operation, and the exhausting of the pilot cylinder of valve 131, sets it for the next press opening operation.

Cylinder 32 is supplied with hydraulic pressure for elevating the entire press from the supply line 122 through a normally closed reverse-acting "Sinclair" diaphragm operated two-way valve 150, the diaphragm of which is controlled by a three-way air operated diaphragm valve 151 operating on low air pressure, which in turn is controlled by a similar valve 152 acting on high air pressure supplied through a "Ross" pilot cylinder controlled four-way master valve 153. Exhaust of cylinder 32 is controlled by two normally closed reverse-acting "Sinclair" diaphragm-operated two-way valves 154 and 155 arranged in parallel between pipe 34 and drain line 124. A hand-operated valve 163 is provided in the common drain line from the valves 154, 155 so that the elevator may be shut off and the press operated independently when desired. By providing two parallel drain valves, the valves may be closed in succession thereby decelerating descent of the ram 31 and for this purpose valve 155 is of smaller size and provides less flow than valve 154. The diaphragm of valve 155 is controlled by a three-way air valve 156 and valve 154 is controlled by a three-way air valve 157.

The diaphragms of valves 156 and 157 are connected by a line 158 through contactor valve 111. A line 159 also connects the diaphragm of valve 156 to a three-way air valve 160 and through a "Logan" cycle valve 161 to a "Ross" four-way pilot controlled master valve 162. The diaphragm of air valve 160 is controlled by contactor valve 115 or manually by valve 117, either of which when depressed may apply air pressure to the diaphragm. Valve 116 may be manually operated to release such pressure.

The pilot cylinder of valve 162 is supplied with air under pressure through line 180 controlled by contactor valves 101 or 103 or manually by valve 118. Valves 101 or 118 connect line 180 to exhaust whereas valve 103 applies pressure thereto from line 135. The arrangement is such that when the press is elevated to its highest position, valve 101 is temporarily opened to exhaust which releases pressure on pilot cylinder of master valve 162 which applies pressure to the diaphragms of valves 156 and 157 which exhaust the diaphragms of valves 154 and 155 opening the drain and lowering the press. As the press nears its lowest position cam 102 on cylinder 10 opens contactor valve 103 admitting air under pressure to the pilot cylinder of valve 162 reversing that valve so that it exhausts valves 156 and 157 closing valves 154 and 155 and stopping the press.

Before cam 102 contacts with valve 103, however, cam 110 contacts with contactor valve 111 closing drain valve 154 in advance of closing of drain valve 155 for decelerating the motion of the elevator.

The diaphragm of air valve 151 is supplied through a pipe 170 from master valve 162 through an air valve 152. When pipe 159 is under pressure, pipe 170 is in exhaust and vice versa. The arrangement is such that when drain valves 154 and 155 are both closed, supply valve 150 would be open if valve 152 were not closed. When the ram 31 reaches its lowest position, however, the valve 152 has been closed as no mold is present on conveyor 28 and no pressure is on the pilot valve of valve 153 and the line from valve 153 to valve 152 is in exhaust. Therefore the supply valve 150 is closed at this position.

The opposite ends of the panel operating cylinder are connected to lines 159 and 170 respectively, the arrangement being such that when contactor valve 101 is opened to exhaust causing the press to be lowered, pressure is applied through valve 162 to the front end of cylinder 107 withdrawing the panel so that it will not interfere with lowering of the press. The cycle valve 161 does not open until the pressure in line 159 builds up to a predetermined adjustable pressure and the panel is therefore withdrawn in advance of opening of the drain valves, and when contactor 103 is depressed it reverses master valve 162 and returns the panel without opening supply valve 150.

The wedge operating cylinders 55, 55' have their rear ends continuously connected as at 171 to a low pressure air line tending to force the wedges in. Their front ends are connected by a line 172 through a three-way diaphragm-controlled air valve 173 to high pressure air line 135 adapted to overbalance the pressure in their rear ends and to force the wedges back when valve 173 is opened. The diaphragm of valve 173 is supplied by pressure or exhausted through valve 152 and master valve 162, whereas the valve 152 is controlled by master valve 153 the pilot cylinder of which is controlled by contactor valve 79 on the outgoing conveyor. The exhaust line 175 of valve 79 is connected through a three-way air valve 176, the diaphragm of which is controlled by contactor valve 109 and is normally open.

When a mold is discharged from the press onto contactor valve 79 this exhausts the pilot cylinder of master valve 153 which applies pressure to valve 152 which puts pressure on valves 151 and 173. Valve 173 thereby applies pressure to the front ends of cylinders 55, 55' and withdraws the wedges. At the same time valve 151 applies pressure to the diaphragm of valve 150 admitting hydraulic pressure to cylinder 32 and causing the press to be elevated. If valve 109 is depressed by a mold on the conveyor and 79 is depressed by a second mold, line 175 is closed by the valve 176 so that the wedges are not withdrawn nor the press elevated until the mold over valve 109 is removed.

When the press has been elevated, air under pressure is admitted to the pilot cylinder of master valve 153 by opening of contactor valve 80 thereby reversing valve 153 which now exhausts valve 152 removing pressure from valves 151 and 173 thereby closing valve 150 to stop elevation of the press and exhausting the front ends of cylinders 55, 55' so that the wedges are forced inwardly by the pressure in their outer ends.

At all times during the molding period between opening movements of the press to transfer molds, the press is closed under pressure requiring valve 120 being open to hydraulic pressure and closed to the drain and these depend upon the pilot cylinder of master valve 153 being kept under pressure. The pilot cylinder of valve 153 would ordinarily be kept under pressure when contactor valve 80 was opened admitting air thereto from line 135. Contactor valve 80 is normally held open when the press is closed, by the stop 76 on a platen contacting therewith, but when the panel 104 is withdrawn in order to permit lowering of the entire press, stop 76 no longer holds this valve open and due to leakage in the line the pressure might be released from the pilot cylinder of master valve 153 now disconnected from the line. To avoid this, a contactor valve 201 is mounted on the panel in a position to be opened by a stationary stop 202 when the panel is in its withdrawn position. This valve is adapted to connect pressure line 135 to the pilot cylinder of master valve 153 to keep it under pressure when the panel is withdrawn. Valve 153 in this position puts air pressure on valves 120 and 123 holding the drain closed and supply line open to cylinder 10 by supplying air from pressure line 135 through pipe 204 through valve 127 to pipe 200.

As previously described, the wedges 50, 50' are urged inwardly under constant low air pressure from pipe 171 and their cylinders 55, 55' are mounted stationary with respect to the press so that they must be withdrawn whenever the press is elevated or lowered. They are withdrawn as previously described by an overpowering air pressure in line 172 applied to the front ends of the cylinders. To insure their being withdrawn whenever the press is elevated or lowered, line 172 is supplied by air under pressure from line 135 through valve 173 either by way of valve 210 or thereabout through line 211. Whenever the press is being raised the valve 152 which opens the hydraulic valve 150 to elevate the press supplies air under pressure to the diaphragm of valve 173 opening line 135 direct to line 172 through valve 173. At this time valve 210 is open between line 135 and line 172 but valve 173 is closed thereto, valve 210 being held open as its diaphragm is on the same line as the front end of the panel cylinder 107 which is under pressure from master valve 162.

When, however, the press is being lowered valve 173 is reversed by exhaust of its diaphragm by valve 152 which is acting to close the hydraulic valve 150 whereas the diaphragm of valve 210 is still under pressure due to the necessity of its pressure line being under pressure to hold back the panel while the press is moving. As a result, air from line 135 then goes through valve 210 and valve 173 to the front end of the wedge cylinder, while line 211 is cut off at valve 173. When the press is stopped either after elevation or lowering thereof all the diaphragms of valves 152 and 210 and 173 are connected to exhaust, as valve 210 is on the same control line from master valve 162 as the front ends of the panel cylinder and must be in exhaust to force the panel in, and valve 173 is on the same control line as valve 151 which must be in exhaust as hydraulic valve 150 must be closed. In this position, the front end of the wedge cylinder exhausts through pipe 172 by way of valve 173 and 210, valve 210 being open to exhaust and closed to pressure line 135. The arrangement is such that the press cannot be elevated or lowered without the wedges 50, 50' being withdrawn.

While the operation of the component parts of the mechanism have been thoroughly discussed in connection with their construction, the general operation of the apparatus may be summarized as follows: A procession of molds which contain moldable material, placed therein in a previous operation, are fed in succession over conveyor 24 to the molding press. The latches 38, 39 obstruct further movement of the first mold in the procession, as shown in Fig. 2. The timing mechanism 75 has been set to the proper molding period and to open the press at regular intervals corresponding in number to the number of molds in the press when the press is completely loaded. Assuming that the press is compeltely loaded with molds and is closed thereon under pressure, the timing device 75 opens a mold-receiving space of the press at the level of the conveyors 24, 28, as shown in Figs. 1 and 3 which illustrate the press as opened at the second mold-receiving space. The ram 47 advances a mold into the press and pushes a mold out onto conveyor 28 which conveys it away. The press closes automatically and the entire press is then elevated to bring its next lower platen on a level with the conveyor when the press is next opened. Loading is continued at intervals until a mold has been loaded on the lowest platen and the press has closed thereon. The entire press is then automatically lowered until its uppermost platen is in position for loading. During the descent of the entire press, the wedges which hold the molds during press opening operations, and the panel 104 carrying the control pilot valves is automatically withdrawn out of the way and when the descent is completed they are automatically advanced to operative position. The opening of the press at regular intervals acts to work entrapped gases from the molded articles.

By use of the invention, the transfer of molds is maintained at a constant level so that molds may be fed to the press and away therefrom without lifting of molds.

The opening of one mold-receiving space at a time is accomplished with minimum use hydraulic fluid thereby effecting a saving in operating cost.

The automatic control of operations insures uniform molding of the material with a reduction of manual effort and provides for interlocking control with a reduction in accidents to operators and to the apparatus.

The opening of the press at regular intervals provides for release of gases from the heated material and assists in providing a superior and more uniform product.

Variations may be made without departing from the scope of the invention as it is defined by the following claims.

I claim:

1. Molding apparatus comprising a molding press having a plurality of movable platens providing a plurality of mold-receiving spaces therebetween, means for feeding molds in succession to successive spaces and for simultaneously discharging molds therefrom, means for bodily moving the press in one direction to align the spaces in succession with said feeding means, means for opening the press by separation of platens at one space at a time to present the spaces between the platens in succession as they are aligned with said feeding means, means for closing the press after each opening movement, and means automatically operable upon closing of the press at the last space of the series for bodily moving the press in the opposite direction from the last loading position to the first loading position when all of the spaces have been loaded.

2. Molding apparatus comprising a molding press having a plurality of movable platens providing a plurality of mold-receiving spaces therebetween, means for feeding molds in succession to said spaces and for simultaneously discharging molds therefrom, means for bodily moving the press in one direction to align the spaces in succession with said feeding means, means for opening the press by separation of platens at one space at a time to present the spaces between the platens in succession as they are aligned with said feeding means, means for closing the press after each opening movement, means automatically operable upon closing of the press at the last of said spaces for bodily moving the press in the opposite direction from the last loading position to the first loading position when all of the spaces have been loaded, and timing means for automatically controlling in timed relation the operation of the feeding, moving, opening, and closing means.

3. Molding apparatus comprising a molding press having a plurality of movable platens providing a plurality of mold-receiving spaces therebetween, means for feeding molds in succession to said spaces and for simultaneously discharging molds therefrom, means for bodily moving the press in one direction to align the spaces in succession with said feeding means, means for separating the platens at one space at a time to present the spaces between the platens in succession as they are aligned with said feeding means, means for bodily moving the press in the opposite direction from the last loading position to the first loading position when all of the spaces have been loaded, timing means for automatically controlling in timed relation operation of the feeding, moving and opening means, and means for preventing feeding of molds when said feeding means and said spaces are out of alignment.

4. Molding apparatus comprising a molding press having a plurality of movable platens providing a plurality of mold-receiving spaces therebetween, means for feeding molds in succession to said spaces and for simultaneously discharging molds therefrom, means for bodily moving the press in one direction to align the spaces in succession with said feeding means, means for opening the press by separation of platens at one space at a time to present the spaces between the platens in succession as they are aligned with said feeding means, means for closing the press after each opening movement, means automatically operable upon closing of the press at the last of said spaces for bodily moving the press in the opposite direction from the last loading position to the first loading position when all of the spaces have been loaded, timing means for automatically controlling in timed relation operations of the feeding, moving, opening, and closing means, and means for preventing bodily movement of said press during mold feeding movements.

5. Molding apparatus comprising a molding press having a plurality of movable platens providing a plurality of mold-receiving spaces therebetween, means for feeding molds in succession to successive spaces and for simultaneously discharging molds therefrom, means for bodily moving the press in one direction to align the spaces in succession with said feeding means, means for opening the press by separation of platens at one space at a time to present the spaces between the platens in succession as they are aligned with said feeding means, means for closing the mold platens after each feeding operation, means automatically operable upon closing of the press at the last of said spaces for bodily moving the press in the opposite direction from the last loading position to the first loading position when all of the spaces have been loaded, timing means for automatically initiating opening movements of the press at successive molding spaces, means controlled by the press opening movements for initiating in timed relation the mold feeding means, means controlled by the movement of the press feeding means for initiating closing of the press after each mold-feeding movement, and means controlled by closing of the press for initiating bodily movement of the press to a new feeding position.

6. Molding apparatus comprising a molding press having a plurality of movable platens providing a plurality of mold-receiving spaces therebetween, means for feeding molds in succession to successive spaces and for simultaneously discharging molds therefrom, means for bodily moving the press in one direction to align the spaces in succession with said feeding means, means for opening the press by separation of platens at one space at a time to present the spaces between the platens in succession as they are aligned with said feeding means, means for closing the press after each opening movement, means automatically operable upon closing of the press at the last of said spaces for bodily moving the press in the opposite direction from the last loading position to the first loading position when all of the spaces have been loaded, and timing means for automatically controlling in timed relation the operations of the feeding, moving, opening, and closing means, said timing means comprising contact means located in the path of the press platens and operable upon contact with the platens, and means for automatically withdrawing said contact means from said path during bodily movement of the press in one direction.

7. Molding apparatus comprising a molding press having a plurality of movable platens providing a plurality of mold-receiving spaces therebetween, said press being bodily movable in a direction to present different mold-receiving spaces at a station in the path of movement, means at said station for feeding molds in succession to said spaces between the platens of the press and for discharging molds therefrom, means for bodily moving the press to align the spaces in succession with said feeding means, and means for separating the platens in succession at said station to receive and discharge said molds at said station while retaining platens at other positions in mold-closing relation.

8. Molding apparatus comprising a molding press having a plurality of vertically movable platens providing a plurality of mold-receiving spaces therebetween, said press being bodily movable in a vertical direction to present different mold-receiving spaces at a station in the path of bodily movement of the press, means at said station for feeding molds in succession to said spaces between the platens at said station and for discharging molds therefrom at said station, means for bodily moving the press to align the spaces in succession with said feeding means, means for separating the platens to open the spaces therebetween in succession as they are aligned at said station with said feeding means, and means for retaining some of the platens in molding position during such separating movement.

9. Molding apparatus comprising a molding press having a plurality of movable platens providing a plurality of mold-receiving spaces therebetween, said press being bodily movable in a direction to present different mold-receiving spaces at a station in the path of movement, means at said station for feeding molds in succession to successive spaces between platens at said station and for discharging molds therefrom at said station, means for bodily moving the press to align the spaces in succession with said feeding means, means for separating the platens in succession at said station to present the spaces between the platens in succession as they are aligned with said feeding means, means for retaining some of the platens in molding position, and means for retaining the platen to be loaded in loading position during the feeding movement.

10. Molding apparatus comprising a molding press having a plurality of vertical movable platens providing a plurality of mold-receiving spaces therebetween, said press being bodily movable in a vertical direction to present different mold-receiving spaces at a station in the path of movement, means at the level of said station for feeding molds in succession to successive spaces and for simultaneously discharging molds therefrom, means for bodily moving the press in one direction to align the spaces in succession with said feeding means, means for opening the press by separation of platens at one space at a time to present the spaces between the platens in succession at said level as they are aligned with said feeding means, means for closing the press after each feeding movement, means automatically operable upon closing of the press at the last of said spaces for bodily moving the press in the opposite direction from the last loading position to the first loading position when all the spaces have been loaded, timing means for automatically controlling in timed relation operation of the feeding, moving, opening, and closing means, and means for preventing closing of said press during mold-feeding movements.

11. Molding apparatus comprising a plurality of vertically movable platens disposed one above the other and providing a plurality of mold-receiving spaces therebetween, means for moving the platens as a group step by step past a station level, means for separating adjacent platens successively at said level, means for successively loading molds and simultaneously discharging molds between separated platens at said level, means for preventing the separation of platens above said level during each loading and discharging operation, means for heating the platens, and means for applying pressure to all the platens between the loading and discharging operations.

OTTO E. HERMANNS.